United States Patent [19]

Andersson et al.

[11] 4,408,750
[45] Oct. 11, 1983

[54] METHOD AND ARRANGEMENT FOR SPREADING COVERING MATERIAL

[75] Inventors: Kjell Andersson, Nyköping; Ragnar Forsell, Oxelösund, both of Sweden

[73] Assignee: Scandinavian Lancers Aktiebolag, Hoganas, Sweden

[21] Appl. No.: 352,865

[22] Filed: Mar. 12, 1982

[30] Foreign Application Priority Data

Feb. 26, 1981 [SE] Sweden ................................ 8101242

[51] Int. Cl.³ .............................................. C21C 7/00
[52] U.S. Cl. ......................................... 266/216; 75/53; 75/58
[58] Field of Search ............... 266/216; 75/53, 130 R, 75/58, 61, 96, 257

[56] References Cited

U.S. PATENT DOCUMENTS 2,805,147 9/1957 Schreiber .......................... 75/130 R
3,598,383 8/1971 Moore ..................................... 75/53
4,277,279 7/1981 Kerlin ..................................... 75/53

Primary Examiner—P. D. Rosenberg
Attorney, Agent, or Firm—Murray and Whisenhunt

[57] ABSTRACT

The present invention relates to a procedure and an arrangement for spreading pulverized or granular additive material, preferably covering material, on the surface of a metal melt, preferably a steel melt, which is in an open metallurgical ladle by means of a spreading arrangement whereby at least a predetermined quantity of additive is made available in a dosing container whereby the dose is sub-divided into partial doses, the ladle is placed underneath the dosing container, the additive dose is made to fall under its own weight onto the surface of the metal melt and is spread out on the surface by means of a spreader which is connected to the dosing container.

The arrangement for performing the procedure comprises a spreader (b 1) which consists of two or more concentrically-arranged truncated tubular cones (2), a dosing container (3), two valves (8), (9) for filling and emptying respectively the container (3). The dosing container (3) is provided with two or more concentrically arranged tubular elements (4) adjoining to the tubular cones (2) which comprise walls in concentrically arranged divisional containers and connected to a filling hopper which is common to all the divisional containers and above which a transport container (12) is placed.

5 Claims, 2 Drawing Figures

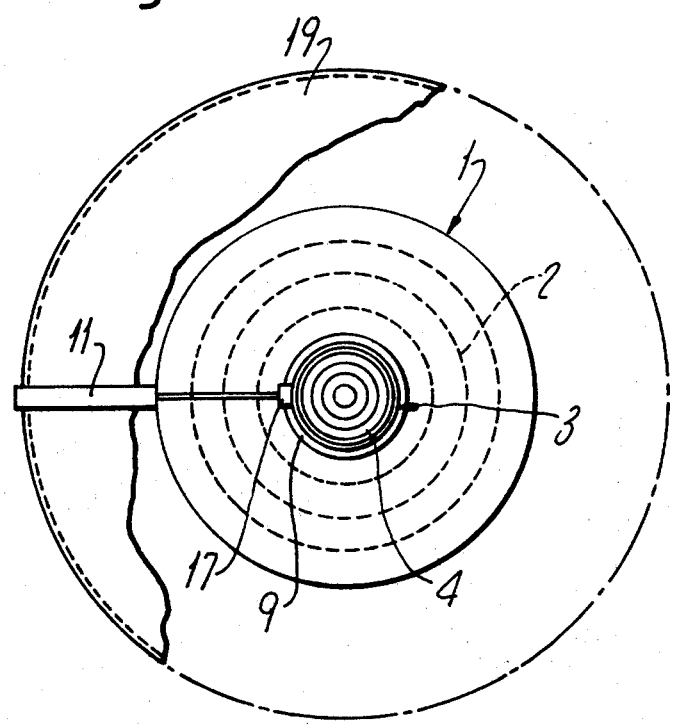

METHOD AND ARRANGEMENT FOR SPREADING COVERING MATERIAL

The present invention relates to a method and an arrangement for spreading covering material on the surface of a metal melt which is in a metallurgical ladle.

When handling and transporting molten metal, e.g. molten steel, in open ladles attempts are made to reduce heat emission from the surface of the melt by covering the surface with a heat insulating or covering agent, which is usually fly ash from, for example, a thermal power station but which can also comprise mixtures of different agents, e.g. mixtures consisting of exothermic agents such as aluminium and powdered coal, lime or ceramic agents such as crushed fire clay or dolomite. Methods so far known for spreading these covering agents over the melt surface have the disadvantage that the coverage is extremely uneven which means that best results are not achieved. One explanation for the difficulties with current spreading methods is that these are manual and are performed under difficult working conditions, with intense heat and intense generation of smoke. Hence attempts have been made to develop covering materials containing constituents such that the material spreads on its own across the surface of the melt, e.g. gas-emitting agents inter alia containing calcium carbonate, but even using such methods it has not been possible to achieve maximum insulation effect on the part of the agent.

It is also known that covering materials of low density provide better coverage over the surface of the melt than heavier materials. The lighter covering materials have however an increased tendency towards dust formation and fusion than the heavier materials, which is a disadvantage. Dependent on the type of material of which the melt consists, it is also important that gases from any gas-emitting material should not be absorbed in the melt. As regards steel, water vapour for example is harmful in that it decomposes whereby hydrogen can be absorbed in the steel. A major disadvantage of the majority of composite covering materials is also that they are relatively expensive as compared with a single covering material such as for example crushed fire clay.

The object of the present invention is to provide for good mechanical spreading of a covering material without any manual intervention other than monitoring and without smoke and dust spoiling the workplace environment. Another aim of the invention is to reduce the consumption of covering material and to obtain better utilisation of its heat-insulating characteristics by obtaining uniform coverage of the covering material.

It is known that during the refining of steel efficient spreading of covering material dissolves any slag which accompanies the steel from the refining process in the steel furnace and which after teeming of the steel has finished can be more easily poured from the ladle. The slag can also be given properties such that phosphorus is prevented from returning from the slag to the steel, while aluminium recovery, i.e. the retention of added aluminium, increases because the efficient spreading of covering material prevents the formation of iron oxides during gas purging in the ladle, the said iron oxides tending to reduce aluminium recovery. It is also known that a ladle lining of for example aluminium oxide lasts longer because of the good dissolution of the furnace slag.

For example, good sealing of the surface of a 150 ton steel melt in an open ladle is obtained by adding 300 kg crushed fire clay in accordance with the present invention, which also provides the metallurgical advantages described above. To obtain corresponding results in accordance with methods known hitherto and using covering agents known hitherto it is necessary, apart from meticulous manual operations, to also employ covering mateials which are about four times as expensive.

The present invention will be described in the following by way of an embodiment and with reference to the appended diagrams.

FIG. 2 illustrates the invention, viewed in section from the top, along the line A—A in FIG. 1.

Figure 1:
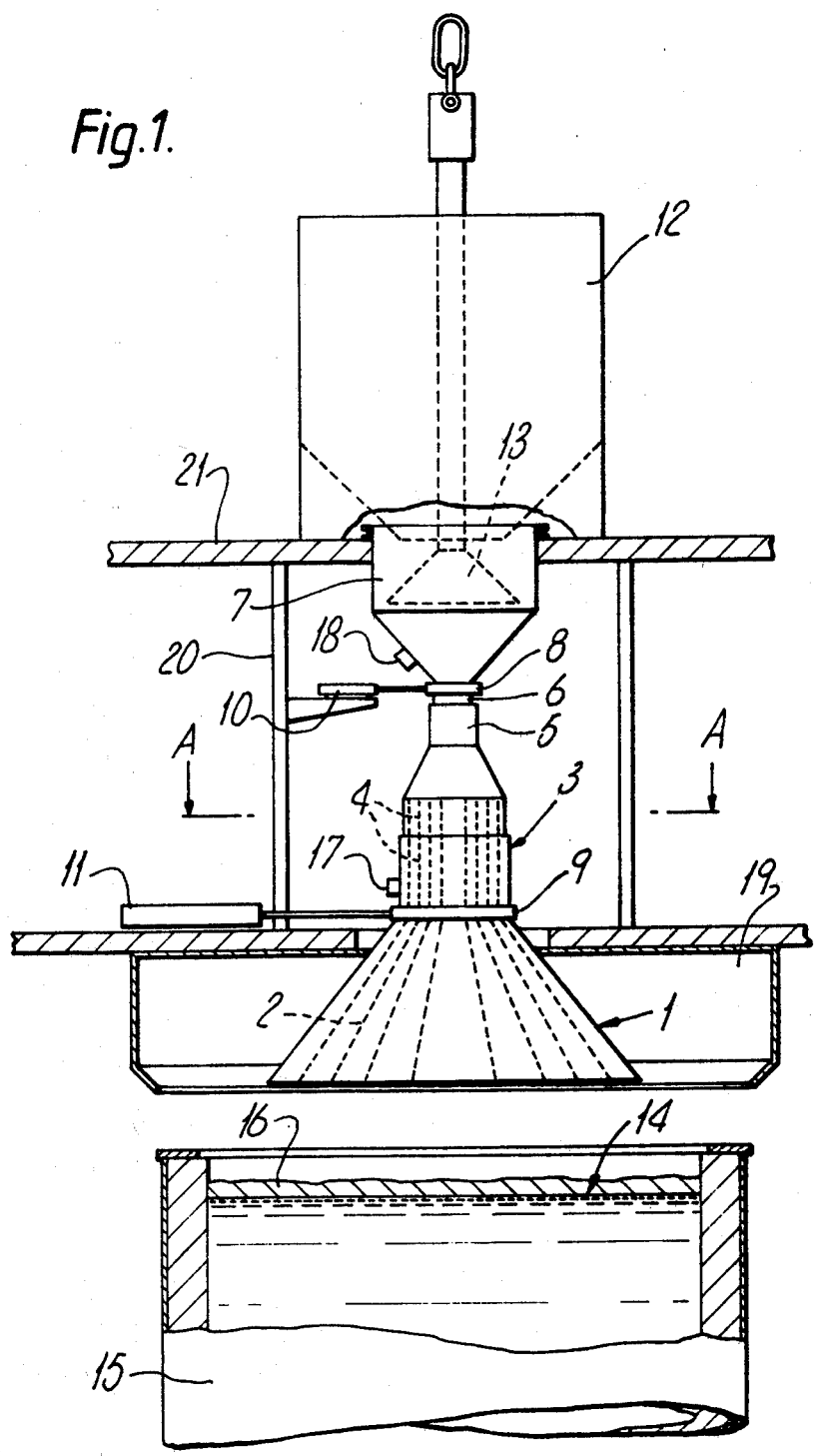
FIG. 1 illustrates the invention, in section from the side, and with a metallurgical ladle placed underneath.

The invention consists of a spreader 1 which is made up of several concentrically-positioned plates in the form of truncated cones 2 together with a dosing container 3. This consists of two telescopically-movable halves so as to enable the dose size to be adjusted and is provided internally with concentric intermediate walls 4. The upper half is provided with a collar 5 which is telescopically-movable on an inner tube 6 which in turn is placed at the bottom of a filling hopper 7. The dosing container 3 is provided with an upper and a lower shut-off valve 8 and 9 respectively which are actuated by means of associated compressed air cylinders 10, 11 for filling and emptying respectively the container 3. A transport container 12 for covering material is placed above the hopper 7 and is provided with a bottom emptying arrangement 13 which, when the container is placed above the hopper 7, provides a continuous supply of covering material to the latter.

When spreading covering material on a surface 14 of a steel melt which is in an open ladle 15 placed underneath the spreader 1, first of all the dosing container 3 is filled with covering material by opening valve 8 and closing it after filling. The dosage of covering material in this position is divided between the concentric tubular cavities in the container 3. Then valve 9 is opened, and covering material runs downwards from each tubular cavity through an adjacent gap, having the shape of a tapered tube, and down onto the surface 14 of the melt where it forms a relatively uniform coating 16. Each tubular cavity in the container 3 has a volume such that it contains the amount of covering material required on the surface of the melt underneath the corresponding tapered tube gap to give a uniform coating of covering material.

To simplify the filling of the container 3 and to prevent blockages, the latter and the hopper 7 are provided with vibratory devices 17, 18. To prevent dust and smoke making their way into the workplace the spreader 1 is surrounded by a hood 19 which is also provided with an extraction arrangement, not shown in the diagram.

The spreader 1, the container 3 and the hopper 7 are together with the associated devices arranged on a pedestal 20 which permits the ladle 15 to be introduced underneath, to be provided with covering material and conveyed further for pouring. Operation and monitoring are undertaken from level 21 on the pedestal 20.

In those cases where a thicker coating of covering material is required on the surface of the melt two or more doses can be spread. It is also possible, but this is not shown in the diagrams, to adjust the dosage volume of the container 3 by mechanical means, by providing this with for example one or several screws which, when made to rotate a certain number of revolutions, move the upper half of the container 3 upwards or downwards to give the desired dose volume.

The present invention is also designed to be capable of use when spreading other powdered or granular additives, e.g. as protective agent during aluminium purging, i.e. when aluminium wire is fed downward into an open ladle, or during the admixture of synthetic slag for sulphur removal.

We claim:

1. Apparatus for spreading powdered or granulated material on the surface of a metal which is contained in an open metallurgical ladle located beneath said apparatus, said apparatus comprising dosing container means for providing a predetermined quantity of said material to be spread upon the metal melt surface, first and second valve means located above and below, respectively, said dosing container means for filling and emptying, respectively, said dosing container means, spreading means for spreading material from said dosing container means on said surface and including a plurality of truncated tubular cone means arranged concentrically to each other for defining spreading passageways leading from said dosing container means towards said surface, said dosing container means including a plurality of concentrically arranged tubular wall means for dividing said dosing container into concentrically arranged divisional containers adjoining said tubular cones with each divisional container being associated with a respective spreading passageway, and a filling aperture which is common to all said divisional containers.

2. Apparatus of claim 1, wherein said filling aperture includes a filling hopper means for receiving material from a transport container placed thereabove and supplying such material to said dosing container means.

3. Apparatus of claim 2, wherein said dosing container means includes an upper portion and a lower portion thereof, said portions being telescopically movable with respect to each other.

4. Apparatus of claim 1, wherein the upper portion of the dosing container means includes a collar, and the lower portion of the filling hopper means includes a tube, said collar surrounding said tube and being displaceable in relation thereto.

5. Apparatus of claim 1, wherein said spreading means is surrounded by a hood which includes dust extraction means for extracting dust from the vicinity of said spreader.

* * * * *